US008351702B2

(12) United States Patent  (10) Patent No.: US 8,351,702 B2
Jang  (45) Date of Patent: Jan. 8, 2013

(54) HANDWRITING COMPOUND SYSTEM

(75) Inventor: Kyung-Ho Jang, Seoul (KR)

(73) Assignee: Korea University Holdings Co., Ltd., Seoul (KR)

( * ) Notice: Subject to any disclaimer, the term of this patent is extended or adjusted under 35 U.S.C. 154(b) by 188 days.

(21) Appl. No.: 12/994,810

(22) PCT Filed: May 29, 2009

(86) PCT No.: PCT/KR2009/002879
§ 371 (c)(1),
(2), (4) Date: Nov. 26, 2010

(87) PCT Pub. No.: WO2009/145589
PCT Pub. Date: Dec. 3, 2009

(65) Prior Publication Data
US 2011/0075929 A1  Mar. 31, 2011

(30) Foreign Application Priority Data

May 30, 2008  (KR) .......................... 10-2008-0050987

(51) Int. Cl.
*G06K 9/18* (2006.01)
(52) U.S. Cl. ........................................ 382/186; 382/185
(58) Field of Classification Search .................. 382/182, 382/186, 309, 310, 311, 229, 230, 231
See application file for complete search history.

(56) References Cited

U.S. PATENT DOCUMENTS 5,075,896 A * 12/1991 Wilcox et al. ................. 382/225
5,588,073 A * 12/1996 Lee et al. ...................... 382/187
7,979,795 B2 * 7/2011 Borgaonkar et al. ......... 715/268

(Continued)

FOREIGN PATENT DOCUMENTS

JP  2004-004302 A  1/2004

(Continued)

OTHER PUBLICATIONS (Li, Xiaolin, "Online Handwritten Alphanumeric Character Recognition Using Dominant Points in Strokes", Aug. 23, 1996, HongKong University of Science and Technology).*

(Continued)

*Primary Examiner* — Samir Ahmed
*Assistant Examiner* — Totam Le
(74) *Attorney, Agent, or Firm* — Jefferson IP Law, LLP (57) ABSTRACT

A handwriting compound system is provided. The system includes a handwriting recognition module that receives a proper number of letters from a user, detects a distance between phonemes/syllables, and shapes and locations of the phonemes/syllables, and recognizes the user's handwriting. The system also includes a point designating module, a reference point setting module and a handwriting transforming module. The point designating module designates a particular one of the subdivided positions in each phoneme recognized by the handwriting recognition module. The reference point setting module sets a reference point, serving as reference for the alteration of a phoneme/syllable, inside or outside the user's input phoneme/syllable recognized by the handwriting recognition module. The handwriting transforming module designates x and y coordinates of a first point with respect to the reference point. The handwriting transforming module sets x and y coordinates of the next points following the first point, based on the distances between a previous and the next point in the x- and y-axes, to determine a relative coordinate of each point. The handwriting transforming module alters a relative coordinate of a particular phoneme/syllable or a particular point. The handwriting transforming module transforms the position, distance, and shape of handwriting.

6 Claims, 4 Drawing Sheets

U.S. PATENT DOCUMENTS 8,103,100 B2 * 1/2012 Jang .............................. 382/187
2008/0221893 A1 * 9/2008 Kaiser ........................... 704/257

FOREIGN PATENT DOCUMENTS

| KR | 10-2005-0012864 A | 2/2005 |
|---|---|---|
| KR | 10-0801224 B1 | 1/2008 |
| KR | 10-0933707 B1 | 6/2008 |

OTHER PUBLICATIONS (Tappert, Charles, "The State of the Art in On-Line Handwriting Recognition", Aug. 1990, IEEE transactions on Pattern Analysis and Machine Intelligence, vol. 12, No. 8).*

* cited by examiner

* The point indicated by symbol * refers to the reference point of '가' and its coordinate means a distance from the reference point.

Default coordinates of '가':

| NO. of point | x coordinate | y coordinate |
|---|---|---|
| 1st point | 1 | 3 |
| 2nd point | 2.5 | 3 |
| 3rd point | 3.5 | 4.5 |
| 4th point | 2.5 | 6 |
| 5th point | 5.5 | 1.5 |
| 6th point | 5.5 | 8 |
| 7th point | 5.5 | 4.5 |
| 8th point | 7 | 4.5 |

Fig 3.

Circle point: the reference point of each Korean syllable
Rectangle point: the reference point of each phoneme
Triangle point: coordinate of a phoneme used to set the
reference point of the next phoneme
Asterisk point: coordinate of a vowel to set the reference
point of the next Korean syllable Procedure:

1. Consonant 'ㄱ' of '간'is written from the reference point
   indicated by the circle located at the top left of '간'
2. The reference point (indicated by a rectangle) of vowel
   'ㅏ' in '간' is determined by the coordinate of the first
   triangle point in '간'
3. The reference point of the final position 'ㄴ' in '간' is
   determined by the coordinate of the first triangle point
   in vowel 'ㅏ' in '간'
4. The reference point of the next Korean syllable '다' is
   determined by the coordinate of the asterisk point in vowel
   'ㅏ' in '간'
5. Consonant 'ㄷ' of '다' is written from the reference point
   of '다' that is determined by the vowel 'ㅏ' of '간'
6. The reference point of vowel 'ㅏ' in '다' is determined by
   the triangle point in 'ㄷ' of '다'
7. The reference point (indicated by a circle) of the next
   Korean syllable is determined by the coordinate of the
   asterisk point in vowel 'ㅏ' in '다'

FIG. 4

When x coordinate of the 2nd point of '가' is '+1' at random and x coordinate of the 3rd point of '가' is '-1' at random, the x coordinates of consonant 'ㄱ' are varied with respect to relative and absolute coordinates as follows:

- Variation in relative coordinate -

| NO. of point | x coordinate | y coordinate |
|---|---|---|
| 1st point | 1 | 3 |
| 2nd point | 1.5 -> 2.5 | 0 |
| 3rd point | 1 -> 0 | 1.5 |
| 4th point | -1 | 1.5 |
| 5th point | 2.5 | -4.5 |
| 6th point | 0 | 6.5 |
| 7th point | 0 | -3.5 |
| 8th point | 1.5 | 0 |

- Variation in absolute coordinate -

| NO. of point | x coordinate | y coordinate |
|---|---|---|
| 1st point | 1 | 3 |
| 2nd point | 2.5 -> 3.5 | 3 |
| 3rd point | 3.5 -> 2.5 | 4.5 |
| 4th point | 2.5 | 6 |
| 5th point | 5.5 | 1.5 |
| 6th point | 5.5 | 8 |
| 7th point | 5.5 | 4.5 |
| 8th point | 7 | 4.5 |

HANDWRITING COMPOUND SYSTEM

BACKGROUND OF THE INVENTION

1. Field of the Invention

This invention relates to handwriting recognition systems, and more particularly, to a handwriting compound system that can automatically infer a user's handwriting and automatically embody it in a vector manner, in real time, thereby compounding it in various, free types of forms.

2. Description of the Related Art

In a computer-based environment, there are many systems that can receive and analyze a user's handwriting samples and can automatically embody them. Korean Patent Registration No. 801224 disclosed a system that receives a certain number of user's handwriting samples and automatically creates them by means of a computer program or other applications.

Korean Patent Registration No. 801224, owned by the applicant of this invention, relates to a system and method for embodying a user's handwriting. The system includes a phoneme classifying module, a handwriting input module, a shape determining module, a distance determining module, a position determining module, a handwriting compounding module, and an output module. The phoneme classifying module classifies Hangeul (Korean alphabet) phonemes in to a group of 19 consonants, five groups of vowels classified based on a similar form, and a group of final position group in Hangeul. The phoneme classifying module includes a reference line setting unit for measuring the reference line that is applied to the group of vowels in order to employ the principle of Cheon-Ji-In. The handwriting input module receives at least 190 forms of handwriting via sample sentences. The shape determining module includes: a bent measuring unit for detecting a bent state of a run from each phoneme or syllable of a handwriting sample; a point designating unit for designating a point at a bent portion of a run (R) via the bent measuring unit; a curvature measuring unit for designating only a certain number of points if the run (R) is a curve; and a curvature determining unit. The curve determining unit includes a curve substituting means for determining whether the curve, designated by the curvature measuring unit, matches a preset arc. The distance determining module measures a vertical or horizontal distance between the outermost points at the top and bottom and between the outermost points at the right and left of two phonemes or two syllables. The position determining module determines the positions of the outermost points at the top, bottom, right and left of two phonemes or two syllables. The handwriting compounding module compounds various types of handwriting samples based on data detected by the shape determining module, the distance determining module, and the position determining module. The output module outputs the handwriting samples compounded by the handwriting compounding module.

The handwriting compounding module includes: a font generating unit for generating fonts based on the handwriting samples processed as data; and a real-time generating unit for compounding received handwriting samples in real time. The handwriting compounding module receives a user's handwriting one or more times in order to perform a change of font, calculates an average with respect to a number of handwriting samples, and embodies a standard handwriting.

The conventional handwriting compounding method (or the handwriting compounding module) of the system generates the user's handwriting as fonts. This makes the user's handwriting style in the same shape or a fixed shape. In order to prevent this uniformity of a user's handwriting, a method was proposed to variously generate a user's handwriting via their average form. However, the conventional method for calculating an average form and compounding handwriting samples just acquires a med-value among two or more handwriting samples and embodies the handwriting. This may have a disadvantage in that it can embody a new handwriting style that quite differs from the user's original handwriting. In addition, since the conventional method must receive a user's handwriting at least two or more times in order to employ the user's handwriting based on an average, it inconveniences the user.

Therefore, a system is required to process fonts, at the steps of recognizing and then compounding a user's handwriting samples, and their averages. In addition, a system is required for including a handwriting transformation means for embodying various types of handwriting samples. A system is also required to control handwriting transformation that can thus prevent the creation of handwriting that quite differs from a user's original handwriting.

SUMMARY OF THE INVENTION

The invention has been made in view of the above problems, and provides a handwriting compound system that can analyze and recognize a user's input handwriting and can compound it. This system employs a relative coordinate manner where a reference point and points of a phoneme or a syllable are designated a distance from a previous point to the next point is set to a coordinate of the next point. The system performs handwriting transformation by relative distance, thereby allowing the user to freely vary multiple, dynamic types of handwriting, while retaining the default shape of their handwriting.

The invention further provides a handwriting compound system that can reduce the amount of calculation or the amount of data, required to set fonts, by setting the fonts via a vector technique using a relative distance. The handwriting compound system can resolve the conventional problem where it is difficult to vary handwriting according to various types and the amount of data increases.

The invention further provides a module that can set a limitation of a change of handwriting and automatically compensate the handwriting, thereby preventing damage to a user's characteristic handwriting while applying transformation to the user's handwriting.

In accordance with an exemplary embodiment of the invention, the invention provides a handwriting compound system includes a handwriting recognition module, a point designating module, a reference point setting module and a handwriting transforming module. The handwriting recognition module receives a proper number of letters from a user, detects a distance between phonemes/syllables, and shapes and locations of the phonemes/syllables, and recognizes the user's handwriting. The point designating module designates a particular one of the subdivided positions in each phoneme recognized by the handwriting recognition module. The reference point setting module sets a reference point, serving as reference for the alteration of a phoneme/syllable, inside or outside the user's input phoneme/syllable recognized by the handwriting recognition module. The handwriting transforming module designates x and y coordinates of a first point with respect to the reference point. The handwriting transforming module sets x and y coordinates of the next points following the first point, based on the distances between a previous and the next point in the x- and y-axes, to determine a relative coordinate of each point. The handwriting transforming module alters a relative coordinate of a particular phoneme/syllable or a particular point. The handwriting transforming module transforms the position, distance, and shape of a handwriting sample.

Preferably, the handwriting compound system may further include a transformation adjusting module. The transformation adjusting module includes: a limitation setting unit for setting a limitation of the size of the handwriting altered by the handwriting transforming module; and a transformation altering unit for calculating the size of the handwriting, transformed by the handwriting transforming module, and automatically compensating the size of the handwriting within the limitation when the size of the handwriting exceeds the limitation.

BRIEF DESCRIPTION OF THE DRAWINGS

The features and advantages of the invention will become more apparent from the following detailed description in conjunction with the accompanying drawings, in which.

DETAILED DESCRIPTION OF EXEMPLARY EMBODIMENTS

Hereinafter, exemplary embodiments of the invention are described in detail with reference to the accompanying drawings. Although the drawings represent an embodiment of the invention, the drawings are not necessarily to scale and certain features may be exaggerated or omitted in order to better illustrate and explain the invention. The same reference numbers are used throughout the drawings to refer to the same or similar parts.

The handwriting compound system of the invention receives a user's handwriting, recognizes the distance, position, and shape of the received phoneme/syllable, and compounds the handwriting in various shapes, based on the recognized information, as partially shown in Korean Patent Registration No. 801224. That is, the handwriting compound system of the invention particularizes the handwriting compounding module shown in Korean Patent Registration No. 801224, so that it analyzes and recognizes a user's handwriting and compounds a various types of handwriting based on the recognized user's handwriting.

Figure 1:
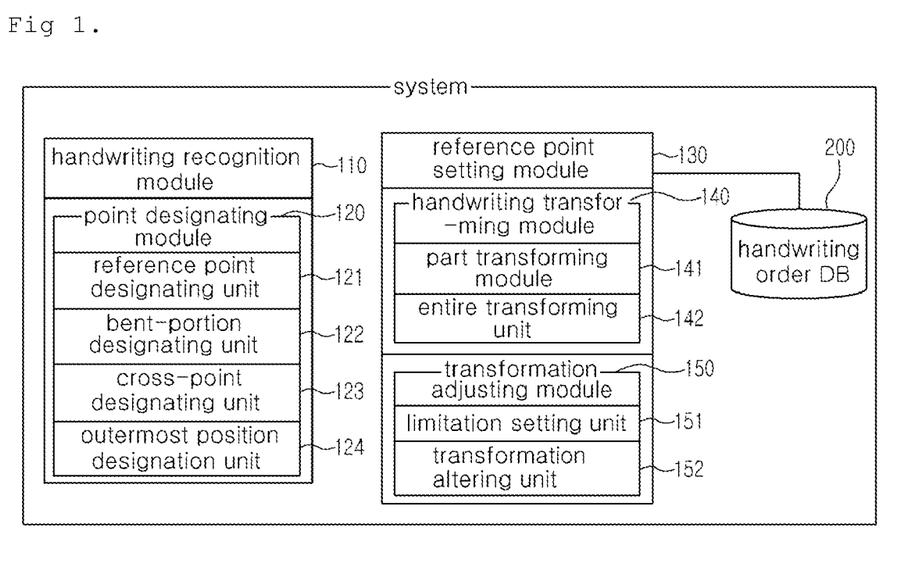
FIG. 1 illustrates a schematic block diagram of a handwriting compound system according to an embodiment of the invention.

FIG. 1 illustrates a schematic block diagram of a handwriting compound system according to an embodiment of the invention.

As described above, the system improves and particularizes the handwriting compounding module, shown in Korean Patent Registration No. 801224. As illustrated in FIG. 1, the system of the invention includes a handwriting recognition module 110, a point designating module 120, a reference point setting module 130, a handwriting trans forming module 140, and a transformation adjusting module 150.

The handwriting recognition module 110 provides the number of letters that can show a proper number of phonemes to a user. The handwriting recognition module 110 receives a user's handwriting and recognizes the distance, shape, and position of a phoneme/syllable, in order to detect the flow of run by designating points on the handwriting sample. Since the handwriting recognition module 110 of the invention may be implemented via the functions of the handwriting input module, the shape determining module, the position determining module, and the distance determining module, shown in Korean Patent Registration No. 801224, its detailed description is omitted in this application.

The point designating module 120 designates a number of points that indicate a particular object of the user's handwriting samples recognized by the handwriting recognition module 110. Example of the object may be a particular position in a phoneme.

The point designating module 120 designates a number of points, based on a reference, such as a distance or a number of bends, in a state where a start point and an end point are contained in a phoneme, for example, ㄱ.

In an embodiment of the invention, the point designating module 120 includes a reference point designating unit 121, a bent-portion designating unit 122, a cross-point designating unit 123, and an outermost position designation unit 124. The point designating module 120 designates a number of points to particular positions of a phoneme using the functions of the elements.

Points are designated in a phoneme as following references:

1) the start and end points are required to be designed as points in a phoneme, where the designation is performed by a reference point designating unit 121;

2) if there is a bent portion (i.e., a point where two segment meet) in a phoneme, it is required to be designated as a point if possible, and also if the number of bent portions are infinite in a phoneme, for example, consonant 'ㅇ,' a certain number of points, for example, 6 to 12, are required to be designated as points in the phoneme, where the designation is performed by the bent-portion designating unit 122;

3) if there is a cross point in a phoneme or between phonemes (where the cross point refers to a point where three segments are gathered, i.e., a meeting point around which there are three segments, for example, a syllable '가' that has two cross points and one bent portion) or if there is a cross point within a phoneme (where the cross point refers to a point where three segments meet and differs from a bent portion where two segments meet, for example, a consonant ㅂ has two bent portions and two cross points), they are required to be designated as points in a phoneme, where the designation is performed by the cross-point designating unit 123; and 4) the outermost points, such as the top, bottom, right and left, are required to be designated as points in a phoneme, where the designation is performed by the outermost position designation unit 124.

A minimum point continued between the points, i.e., a run, can be defined by designating the points. That is, the points are located on the continued line of a run. The run is not fixed as a single form but instead can be variously altered according to a handwriting transformation method that will be described later.

If the number of points is too a few in each phoneme, the handwriting transformation is difficult to be made properly. On the contrary, if the number of points is too many, it takes much time to perform the handwriting compound. Therefore, the number of points is preferably 4 to 8, except that the number of bent portions is infinite, for example, a consonant, 'ㅇ.'

The reference point setting module 130 set a reference position for setting a position of a syllable in order to compound handwriting, i.e., a syllable.

Figure 2:
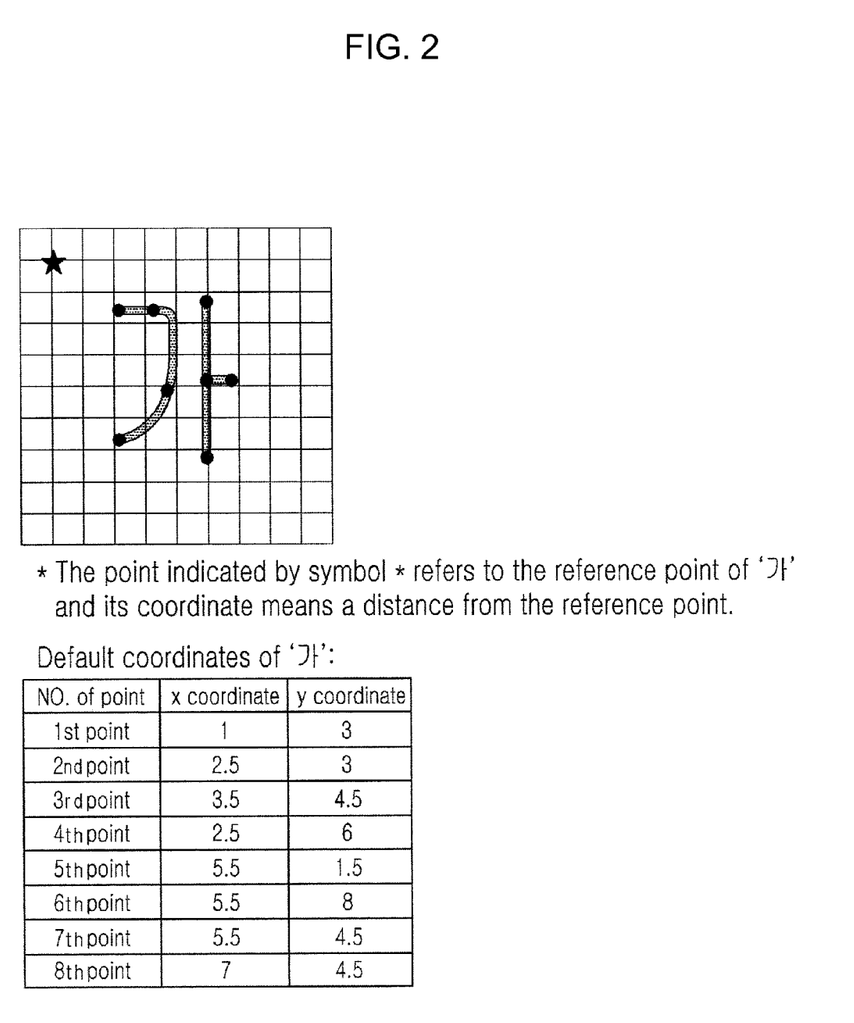
FIG. 2 illustrates a reference point set via a reference point setting module according to an embodiment of the invention.

FIG. 2 illustrates a reference point set via a reference point setting module according to an embodiment of the invention.

As shown in FIG. 2, when a syllable '가,' for example, is compounded, a reference point can be first set to the top left of the consonant ㄱ by the reference point setting module 130.

In an embodiment of the invention, the reference point can be preferably set to a position in the top left outside a syllable or any other positions. That is, the reference point means a position that can represent most properly a corresponding syllable. This reference point provides a ground so that the handwriting transforming module 140 can measure a relative coordinate using a distance from the reference point to a point.

The reference point serves as the origin, i.e., (0, 0), in a two dimensional coordinate space of x- and y-axes. That is, the reference point is used to determine coordinates (which include an absolute coordinate and all relative coordinates) for each point in a syllable.

It is not necessary for each syllable to have a reference point. It is possible that reference points may be set by phonemes/sentences/paragraphs. For example, when there is a sentence on a single row in a notebook, the reference points are in numbers so that they can be set on the same line (i.e., they can have the same y coordinate).

Figure 3:
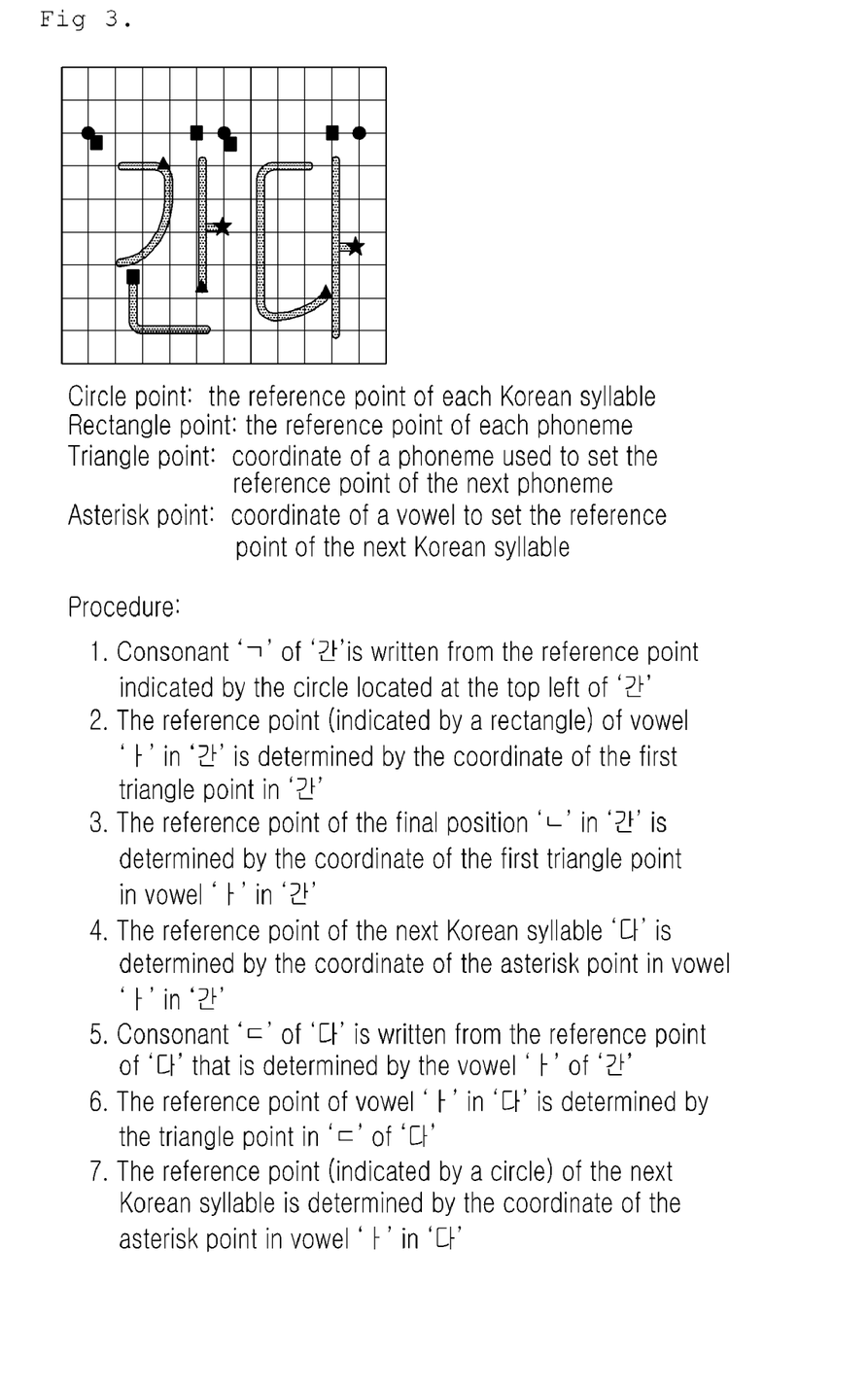
FIG. 3 illustrates a view that describes a method for setting a reference point of each phoneme in a handwriting sample, according to an embodiment of the invention.

FIG. 3 illustrates a view that describes a method for setting a reference point of each phoneme in a handwriting sample, according to an embodiment of the invention.

As shown in FIG. 3, the reference point may be set at every phoneme, where a phoneme serves as a basic unit for a handwriting sample. This is to provide a reference to transform every phoneme. The reference point allows the handwriting sample to be varied in detail.

In order to properly determine a reference point, the order of handwriting syllables, generally written by users, is stored in a handwriting order database 200. That is, a reference point can be properly and conveniently determined, referring to data regarding the order of handwriting each phoneme/syllable, stored in the handwriting order database 200.

The handwriting order database 200 stores data that designates the order of handwriting for each phoneme/syllable. The handwriting order database 200 can be used to set the outermost portion of, for example, a phoneme (e.g., each portion of the top, bottom, right and left in a phoneme, where the point may have been already designated) as a reference point, so that it can be related to the next phoneme, while the database 200 is associating with the point determination information determined by the point designating module 120.

The handwriting transforming module 140 recognizes a users' handwriting and allows the user to arbitrarily transform the handwriting based on the relative coordinate. The handwriting transforming module 140 includes a part transforming module 141 and an entire transforming unit 142.

Figure 4:
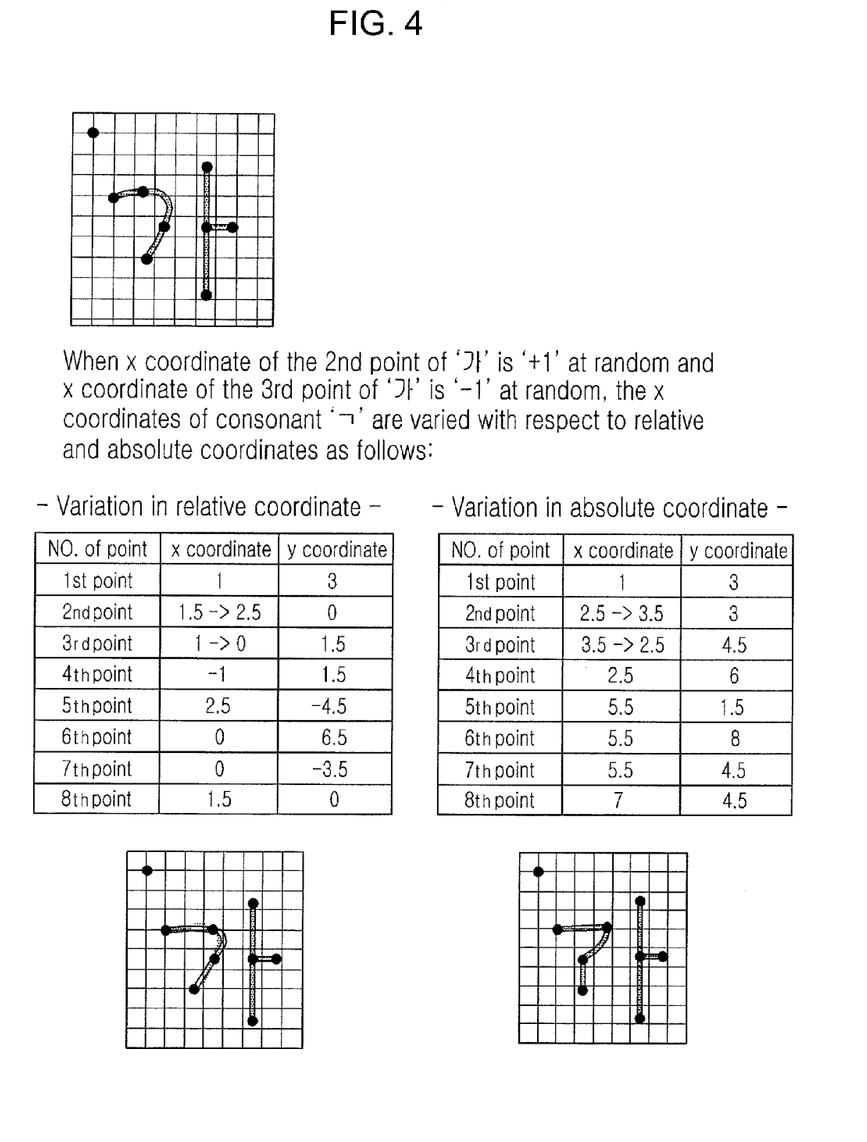
FIG. 4 illustrates a view that describes comparison between the absolute coordinate alteration and the relative coordinate alteration when a handwriting transformation is performed, according to an embodiment of the invention.

FIG. 4 illustrates a view that describes a comparison between the absolute coordinate alteration and the relative coordinate alteration when a handwriting transformation is performed, according to an embodiment of the invention.

As shown in FIG. 4, it is assumed that the numbers are designated according to the order of writing a syllable '가.' When the user alters 1.5 to 2.5 in x coordinate of the second point and 1 to 0 in x coordinate of the third point, the original '가' is transformed to the shape of '가' as shown at the bottom right in FIG. 4 when it is expressed under the absolute coordinate system, where the absolute coordinate system detects the position of each point based on only a distance from a reference point to the point. This is because the coordinates corresponding to only the designated points are altered. Therefore, the user's handwriting is seriously altered, so the pattern of his/her original handwriting is lost.

On the other hand, when the handwriting is expressed under a relative coordinate system that calculates the variations in x and y coordinates from a previous point to a point respectively, the variations in the respective x and y coordinates of the second and third points are also affected to determining the next point, so the original '가' is transformed to the shape of '가' as shown at the bottom left in FIG. 4.

In this case, the user's handwriting is slightly varied, retaining his/her original handwriting characteristic as a whole.

Therefore, the handwriting transforming module 140 performs the variation in the handwriting, by employing a relative coordinate system that determines coordinates based on a relative distance between a reference point and a point, as shown at the right of FIG. 4.

The part trans forming module 141 shows a point designating window that allows a user to designate a point or input an amount of change. When the point designating window is displayed, the user can designate a particular reference point and a particular point for a particular phoneme/syllable/sentence/paragraph. In this case, the handwriting of the phoneme/syllable/sentence/paragraph is varied from the particular reference point/point, based on a corresponding reference point/point. The entire transforming unit 124 varies the distance between points, thereby altering the size of the handwriting sample. The entire transforming unit 124 serves to alter the size of, especially, a syllable, and the distance between syllables.

The handwriting transforming module 140 allows a user to vary his/her handwriting, viewing a previously embodied handwriting sample. To this end, the handwriting transforming module 140 includes an interface that displays a reference point and points in colors. In addition, the handwriting transforming module 140 can also include an interface where, when the user increases or decrease a letter from a particular point via a mouse drag & drop mode, a point of the next phoneme/syllable is automatically varied according to the altered coordinates and the altered letter is displayed.

Therefore, the handwriting trans forming module 140 serves to allow for the change in the handwriting sample, while retaining the whole characteristic of the handwriting.

The transformation adjusting module 150 sets the limitation maximally changeable in handwriting and automatically compensates the handwriting if the handwriting is out of the limitation while the handwriting transforming module 140 performs the alteration of the handwriting.

To this end, the transformation adjusting module 150 includes a limitation setting unit 151 and a transformation altering unit 152.

The operation of the limitation setting unit 151 is described via an example shown in the following table 1. The table 1 describes points having x and y coordinates for a phoneme.

TABLE 1

| No. of point | Coordinate, x | Coordinate, y |
|---|---|---|
| $1^{st}$ point | 1 | 3 |
| $2^{nd}$ point | 1.5 | 0 |
| $3^{rd}$ point | 1 | 1.5 |
| $4^{th}$ point | −1 | 1.5 |
| $5^{th}$ point | 2.5 | −4.5 |
| $6^{th}$ point | 0 | 6.5 |

TABLE 1-continued

| No. of point | Coordinate, x | Coordinate, y |
|---|---|---|
| $7^{th}$ point | 0 | −3.5 |
| $8^{th}$ point | 1.5 | 0 |
| Total Range (Width) | 1 + 1.5 + 1 − 1 + 2.5 + 1.5 = 0~6.5 | 3 + 1.5 + 1.5 − 4.5 + 6.5 = 0~8 |

Referring to table 1, x and y coordinates following the second point means the change of amount with respect to the first point, i.e., a relative coordinate.

When a phoneme has a number of points each of which has x and y coordinates as described in table 1, it has a width (a range of change in x-axis) of 6.5 and a length (a range of change in y-axis) of 8.

The transformation adjusting module 150 (i.e., entire transforming unit) alters the width and length of the phoneme and, especially, can perform the alteration under a preset limitation.

The limitation setting unit 151 sets the limitations of the alteration width and length in handwriting when the transformation adjusting module 150 performs the alteration of the handwriting. The limitation setting unit 151 preferably sets the limitations, based on the % unit.

For example, when the limitation setting unit 151 sets 20% to the limitation of the alteration width and length in table 1, the range of limitation of the alteration width can be set to vary from 5.2 (=6.5−6.5×0.2) to 7.8 (=6.5+6.5×0.2) and the range of limitation of the alteration length can be set to vary from 6.4 (=8−8×0.2) to 9.6 (=8+8.0×0.2).

When the handwriting transforming module 140 alters handwriting so that the alteration exceeds the limitation set by the limitation setting unit 151, the transformation altering unit 152 automatically compensates the handwriting within the limitation.

The following table 2 shows to describe a process to compensate the y coordinate that exceeds the limitation described in table 1.

TABLE 2

| No. of point | x coordinate | y coordinate | Calculation | Modified y coord. |
|---|---|---|---|---|
| $1^{st}$ point | 1 | 3 | 3 * 120/140 | 2.57 |
| $2^{nd}$ point | 1.5 | 0 | 0 * 120/140 | 0 |
| $3^{rd}$ point | 1 | 1.5 | 1.5 * 120/140 | 1.29 |
| $4^{th}$ point | −1 | 1.5 | 1.5 * 120/140 | 1.29 |
| $5^{th}$ point | 2.5 | −3.5 | −3.5 * 120/140 | −3 |
| $6^{th}$ point | 0 | 8.7 | 8.7 * 120/140 | 7.46 |
| $7^{th}$ point | 0 | −3.5 | −3.5 * 120/140 | −3 |
| $8^{th}$ point | 1.5 | 0 | 0 * 120/140 | 0 |
| Total Range | 0~6.5 | 0~11.2 | | 9.6 |

Referring to table 2, x and y coordinates following the second point means the change of amount with respect to the first point, i.e., a relative coordinate.

As described in table 2, when the handwriting transforming module 140 alters handwriting so that its y coordinate increases greater 40% than the original y coordinate, the handwriting exceeds the limitation of 9.6.

In that case, in order to balance the entire size, the points (e.g. $5^{th}$, $6^{th}$, $7^{th}$ and $8^{th}$ points in table 2), from which an alteration starts, and the points (e.g., $1^{st}$, $2^{nd}$, $3^{rd}$, and $4^{th}$ in tale 2), not altered, can be compensated so that their variation is 20% of the limitation, by multiplying 120/140 to the y coordinates, respectively.

While the handwriting transforming module 140 is allowing a user to freely alter his/her handwriting, the transformation adjusting module 150 prevents the handwriting from losing its original characteristics.

The transformation adjusting module 150 adjusts the handwriting of a phoneme/syllable, sets a distance limitation between syllables, and compensates the handwriting within the limitation. For example, when a width/length interval or a space is adjusted between syllables, the transformation adjusting module 150 sets a limitation for the width interval of the syllables. When a user arbitrarily alters the syllables, the transformation adjusting module 150 compensates the syllables to fit the limitation.

The handwriting compound system of the invention does not need to receive the user's same handwriting two or three times after receiving the handwriting and instead applies the amount of change by a relative coordinate to all the user's handwriting. Therefore, the handwriting compound system of the invention allows the user to input his/her handwriting at least number of times and embodies the handwriting variously and dynamically.

As described above, the handwriting compound system of the invention has the following advantages:

1) it can reduce the amount of data and calculation that may be caused when fixed fonts are created and can thus prevent its load;

2) it can transform a user's handwriting via a distance determining method using a relative coordinate, thereby achieving various, free types of handwriting and also preventing the user's characteristic handwriting from being damaged;

3) it can set a limitation of a size of a handwriting sample to be transformed and can automatically compensate the handwriting if it exceeds the limitation, thereby retaining the user's characteristic handwriting; and 4) it can arbitrarily set a reference point, thereby varying the handwriting in various positions, such as top, bottom, right and left, and in shape.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A handwriting compound system including a handwriting recognition module that receives a proper number of letters from a user, detects a distance between phonemes/syllables, and shapes and locations of the phonemes/syllables, and recognizes the user's handwriting, the system comprising:

a point designating module for designating a particular one of the subdivided positions in each phoneme recognized by the handwriting recognition module;

a reference point setting module for setting a reference point, serving as reference for the alteration of a phoneme/syllable, inside or outside the user's input phoneme/syllable recognized by the handwriting recognition module; and a handwriting transforming module for designating x and y coordinates of a first point with respect to the reference point, setting x and y coordinates of the next points following the first point, based on the distances between a previous and the next point in the x- and y-axes, to determine a relative coordinate of each point, altering a relative coordinate of a particular phoneme/syllable or a particular point, and transforming the position, distance, and shape of a handwriting sample.

2. The system of claim 1, further comprising:

a transformation adjusting module, wherein the transformation adjusting module comprises:

a limitation setting unit for setting a limitation of the size of the handwriting altered by the handwriting transforming module; and a transformation altering unit for calculating the size of the handwriting, trans formed by the handwriting transforming module, and automatically compensating the size of the handwriting within the limitation when the size of the handwriting exceeds the limitation.

3. The system of claim 1, wherein the point designating module comprises:

a point designating unit for designating start and end points of a phoneme;

a bent-portion designating unit for limiting and designating, when a phoneme has a definite number of bent-portions, a certain number of points;

a cross-point designating unit for designating a point in a phoneme or between phonemes; and an outermost position designation unit for designating points in the outermost positions at the top, bottom, right and left of a phoneme.

4. The system of claim 1, wherein the handwriting transforming module comprises:

a part transforming module for transforming the handwriting from the designated points to the following points, wherein the part transforming module includes a point designating window that allows a user to designate a particular point and to input the amount of change.

5. The system of claim 1, wherein the handwriting transforming module comprises:

an entire transforming unit for altering the size of the handwriting by altering a distance between points of a phoneme/syllable.

6. The system of claim 1, wherein the handwriting transforming module comprises:

an interface for allowing a following point to recognize the altered coordinates and altering the position of the following point when the user increases or decreases a letter from a particular point via a mouse drag & drop mode.

* * * * *